United States Patent Office 3,513,446
Patented May 19, 1970

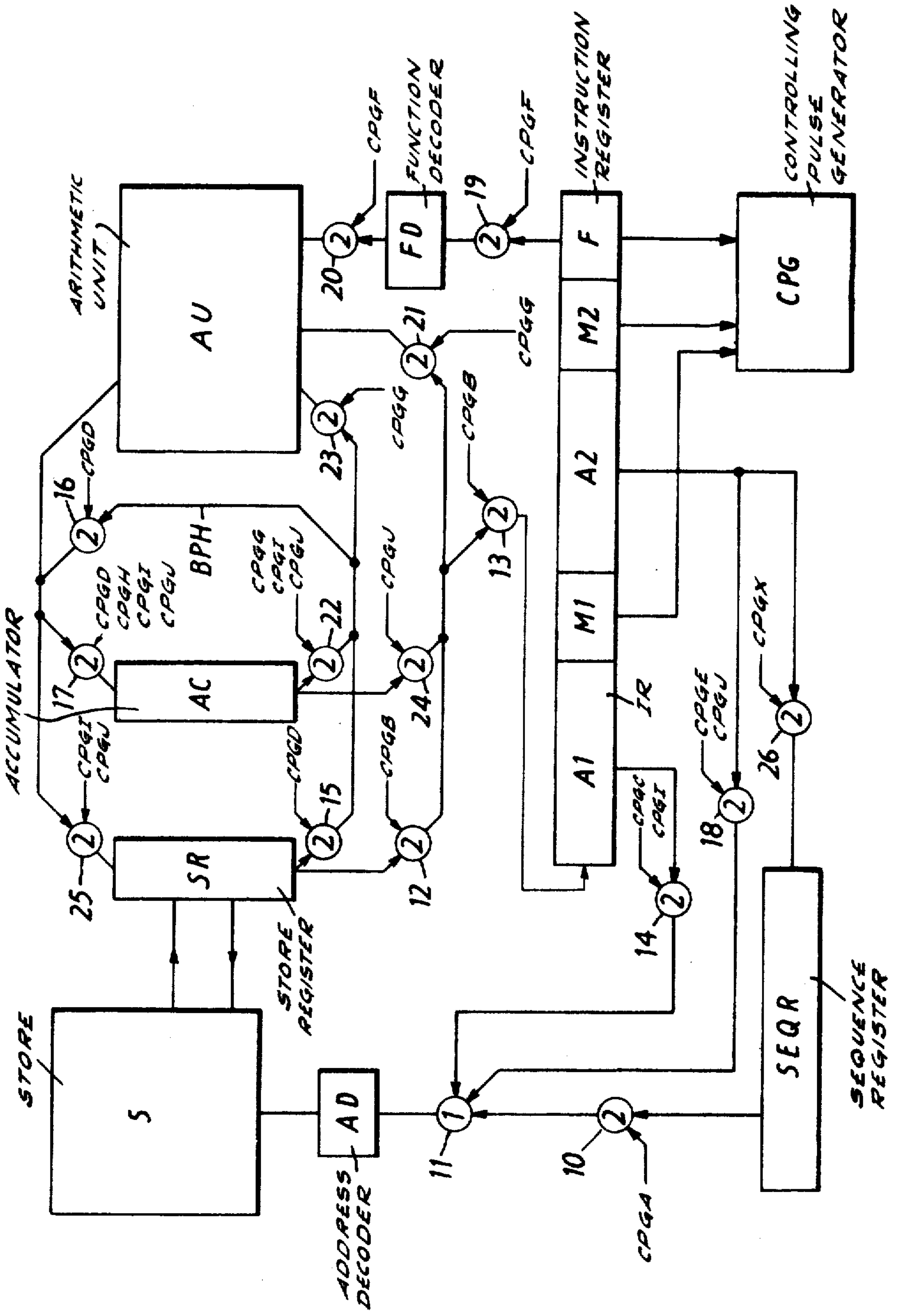
INVENTORS
JOHN MICHAEL COTTON
PETER ANTHONY LLOYD
BY Young & Thompson
ATTYS.

3,513,446

DATA PROCESSING SYSTEM WHEREIN THE INSTRUCTION WORD CONTAINS PLURAL DATA WORD ADDRESSES

John Michael Cotton and Peter Anthony Lloyd, Taplow, England, assignors to British Telecommunications Research Limited, Taplow, Buckinghamshire, England, a British company Filed July 28, 1967, Ser. No. 656,729
Claims priority, application Great Britain, Aug. 12, 1966, 36,305/66
Int. Cl. G06f *9/00;* G11c *7/00*
U.S. Cl. 340—172.5 1 Claim

ABSTRACT OF THE DISCLOSURE

In a data handling device arrangement to perform an operation on the content of some of the addressable locations in a store, circuit arrangements are provided whereby the result of the operation can be inserted into any or all of these locations simultaneously according to the setting or otherwise of the marker bit. The specification particularly describes an application of this to a two address system.

The present invention relates to data processing devices such as computers and is concerned with providing improved methods of working which economise in the number of instruction words, word-storage locations and time required to carry out a given task, so that better and additional service may be obtained from the computer without any appreciable increase in either the complexity or the cost.

In some data handling devices it is arranged that the instruction word includes four addresses, namely two source addresses from which information is obtained, one destination address to which the result of processing the information is transmitted, and the address of the next instruction. The normal operation is then that data are obtained from the two source addresses, dealt with in combination in a manner specified by the function bits in the instruction, e.g. added, and the result returned to the destination address. Application is then made to the fourth address for the next instruction and action then takes place in accordance therewith.

This general description of what normally occurs will include cases which sometimes arise in which for various reasons one or more of these addresses may be dispensed with, for instance because it is implied.

An object of the invention is to provide modifications of this general method of working whereby the operation of the data handling device is made more flexible while at the same time the amount of storage required is not appreciably increased.

According to the invention, a data processing device comprises a store, a plurality of storage sections each denoted by an address, a register arranged to store the address of at least one of said storage sections and circuit arrangements for performing an operation on information stored in those of said storage section whose addresses are stored in the register and for writing the result of said operation into those of said storage sections whose addresses have a marker bit associated therewith.

In accordance with the invention, therefore, it is possible to have a four-address system in which the result of processing of information obtained from two of these addresses may, if desired, be stored in all three addresses, this action being effected simultaneously. Expressed in more general terms, in an *n* address system, the result of an operation performed upon data obtained from any desired ones of ($n$—1) of these addresses may, if desired, be stored in any or all of these ($n$—1) addresses, the remaining address being that of the next instruction.

However in many computers the next instruction address is rearely used since the next instruction is known to be stored in the next address in sequence so that it does not need to be specified.

A further possibility is that the destination address is replaced by an implied address which may be a portion of the computer normally termed an accumulator, which may be either a register or a particular location in the store. This reduces, therefore, to a two-address system in which however the possibilities already discussed still apply.

A two-address system will now be described with reference to the accompanying drawing which is a block schematic diagram.

The device consists basically of a store S, a store register SR, an accumulator AC and an arithmetic unit AU. The connections between these elements, which will be described in more detail subsequently, are such that the contents of the store register and the accumulator may each be fed into the other element or may be fed into the arithmetic unit AU and the output of the arithmetic unit AU may be fed into the store register SR, accumulator AC or both. Access to the store S may be obtained via the store register SR. Operation is controlled by an instruction register IR, a sequence SEQR and a controlling pulse generator CPG. The output of the sequence register SEQR is connected to the store S via an address decoder AD and the output of part of the instruction register IR is connected to the arithmetic unit via a function decoder FD. Control of the various connections is effected by gates as will be explained more fully hereinafter.

Examples of the various units are described in "Understanding Digital Computers" by Paul Siegel, published by John Wiley & Sons Inc. (store S and store register SR on pages 352 to 355 and Fig. 157; arithmetic unit AU on pages 357 to 363 and Figs. 161 and 162; the control units CPG, SEQR, AD, SD and IR on pages 366 and 367 and Fig. 163). The Accumulator AC is similar to the store register SR except that it has serial input and output facilities only.

In operation, the sequence register SEQR contains a sequence of addresses corresponding to a sequence of operations which are to be performed by the computer. The controlling pulse generator CPG applies a path to gate 10, causing the first address in the sequence register SEQR to be applied via gates 10 and 11, and the address decoder AD to store. The contents of this store adress is written into the store register SR. Pulses CPGB are then applied by the controlling pulse generator CPG to the gates 12 and 13 so that the content of the store register SR is transferred to the instruction register IR. In the register IR, the incoming data is interpreted as two addresses A1 and A2, two marker bits M1 and M2 and a function symbol F.

Next, the controlling pulse generator CPG applies a pulse CPGC to the gate 14 so that the address A1 is applied to the store S by the gates 14 and 11 and the address decoder AD. The controlling pulse generator CPG then applies pulses CPGD to the gates 15 and 16 and 17 so that the content of the store register SR (the content of the address A1 in the store S) is transferred to the accumulator AC via a bypass highway BPH which bypasses the arithmetic unit AU. The controlling pulse generator CPG then applies a pulse CPGE to gate 18, so that the address A2 is applied to the store S via the address decoder AD and the content of the address A2 is written into the store register SR.

The controlling pulse generator CPG then applies pulses CPGF to gate 19 and 20 so that the function symbol F is applied via the function decoder FD to the arithmetic unit AU. This instructs the arithmetic unit to perform a specific function on the incoming data for example addition. The controlling pulse generator CPG then applies pulses CPGG both to the gates 12 and 21 to transfer the content of the store register (the data word obtained from the address A2 in the store F) SR to the arithmetic unit AU and the gates 22 and 23 to transfer the content of the accumulator AC (the data word obtained from the address A1 in the store F) to the arithmetic unit AU. The arithmetic unit AU performs the required function on the incoming data and the controlling pulse generator CPG applies a pulse CPGH to the gate 17 to cause the result of the function to be written into the accumulator AC.

In a conventional computer, it would now be necessary to obtain a new instruction from the store S and write it into the instruction register IR to control the insertion of the contents of the accumulator AC into the store S. The invention makes this unnecessary.

If the marker bit M1, associated with the address A1 in the instruction register IR, is in the set condition, the controlling pulse generator CPG supplies pulses CPGI to gates 14, 22, 16 and 25. Consequently the address A1 is applied to the store S via gates 14 and 11 and the address decoder AD. At the same time the content of the accumulator AC is transferred via the gate 22, the bypass highway BPH, the gates 16 and 25 and the store register to the location in the store S indicated by the address A1. Similarly if the marker bit M2, associated with the address A2 in the instruction register IR, is in the set condition, pulses are applied to the gates 18, 22, 16 and 25 so that the contents of the accumulator AC are transferred to the location in the store S indicated by the address A2. If both marker bits M1 and M2 are in the set condition, the contents of the accumulator AC is transferred to both addresses. The computer is then ready for the next instructions address to be extracted from the sequence register SEQR.

Another example of the use of the invention is in conjunction with a "conditional jump" function. A typical instruction is to test the contents of the accumulator AC. If this is positive or zero the computer proceed to the next address in the sequence register SEQR and otherwise to jump to the instruction in the address A2. To implement this, the controlling pulse generator CPG supplies a pulse to the gate 26 via which the address A2 is transferred to the sequence register SEQR. If the marker bit M1 is in the set condition, the contents of the accumulator AC is transferred to the store S, in the manner previously described, prior to the next function.

In certain circumstances the effect of a one-address system may be obtained if one of the source addresses is an implied address, for instance the accumulator. In this case the effect of operating according to the invention will be that dependent on the condition of the marker bit associated with the single address, the result of the processing operation may be stored if desired in the single address and also in the implied address, depending in this case on the function bits.

For example, a one address computer may be used to add a constant to each number of a stored list of numbers. Without the use of a marker bit in accordance with the invention, each addition and reloading of the store would normally require three instruction words; one to load the constant into the accumulator, a second to add the content of a specified address to the content of the accumulator and a third to load the accumulator content back into the specified address.

In accordance with the invention, the same function can be performed with a single instruction word. The constant is stored in the accumulator throughout the whole series of additions. The result of each addition is writted directly into the store register so that none of the results overwrites the constant. The marker bit associated with the address is in the set condition so that the result of each addition is routed back to the address specified by the instruction word.

We claim:

1. A data processing device for processing data words in response to instruction words, each instruction word including at least two data word address sections, each having an associated marker bit settable to a pre-determined state, and a function code section, said data processing device comprising:

a store provided with a plurality of storage locations for storing a set of said instruction words and a set of said data words;

an instruction word register;

instruction word extraction means for extracting one of said set of instruction words from said store and placing it in said instruction word register;

data word extraction means responsive to said instruction word register for extracting from said store, data words specified by respective data word addresses in said instruction word register;

a manipulative process unit responsive to said instruction word register for performing a manipulative process defined by the function code of the instruction word in said instruction word register on said data words extracted by said data words extraction means to produce a result data word;

detector means responsive to said instruction word register for individually detecting whether each of said marker bits is in said pre-determined state; and insertion means responsive to said detection means for applying said result data word to said store for storage in that or those storage locations defined by each of the data word addresses whose associated marker bit is set in said pre-determined condition.

References Cited

UNITED STATES PATENTS

| | | | |
|---|---|---|---|
| 3,283,307 | 11/1966 | Vigliante | 340—172.5 |
| 3,226,694 | 12/1965 | Wise | 340—172.5 |
| 3,222,649 | 12/1965 | King et al. | 340—172.5 |

GARETH D. SHAW, Primary Examiner